(12) United States Patent
Kikuta et al.

(10) Patent No.: US 9,234,312 B2
(45) Date of Patent: Jan. 12, 2016

(54) SIZING AGENT FOR REINFORCEMENT FIBERS, AND APPLICATION THEREOF

(71) Applicant: MATSUMOTO YUSHI-SEIYAKU CO., LTD., Yao-shi, Osaka (JP)

(72) Inventors: Toshihiko Kikuta, Yao (JP); Masahiko Yoshida, Yao (JP); Jun Takaya, Yao (JP); Mikio Nakagawa, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 0 days.

(21) Appl. No.: 14/381,357

(22) PCT Filed: Feb. 27, 2013

(86) PCT No.: PCT/JP2013/055039
§ 371 (c)(1),
(2) Date: Aug. 27, 2014

(87) PCT Pub. No.: WO2013/146024
PCT Pub. Date: Oct. 3, 2013

(65) Prior Publication Data
US 2015/0018451 A1    Jan. 15, 2015

(30) Foreign Application Priority Data

Mar. 29, 2012  (JP) ................................. 2012-076009

(51) Int. Cl.
| | | |
|---|---|---|
| *D06M 15/53* | (2006.01) | |
| *D06M 15/27* | (2006.01) | |
| *C08J 5/06* | (2006.01) | |
| *D06M 13/224* | (2006.01) | |
| *D06M 15/572* | (2006.01) | |
| *D06M 15/507* | (2006.01) | |
| *D06M 15/564* | (2006.01) | |
| *D06M 101/40* | (2006.01) | |

(52) U.S. Cl.
CPC *D06M 15/27* (2013.01); *C08J 5/06* (2013.01); *D06M 13/2246* (2013.01); *D06M 15/507* (2013.01); *D06M 15/53* (2013.01); *D06M 15/564* (2013.01); *D06M 15/572* (2013.01); *C08J 2377/06* (2013.01); *C08J 2433/08* (2013.01); *C08J 2467/02* (2013.01); *C08J 2471/02* (2013.01); *C08J 2475/04* (2013.01); *D06M 2101/40* (2013.01); *D06M 2200/40* (2013.01); *Y10T 428/2918* (2015.01); *Y10T 428/2967* (2015.01); *Y10T 428/2969* (2015.01)

(58) Field of Classification Search
CPC ....................................................... D06M 15/53
See application file for complete search history.

(56) References Cited

U.S. PATENT DOCUMENTS

2004/0197565 A1    10/2004  Sugiura et al.

FOREIGN PATENT DOCUMENTS

| CN | 1701148 A | 11/2005 |
|---|---|---|
| JP | 06-002274 A | 1/1994 |
| JP | 2002-138370 A | 5/2002 |
| JP | 2003-165849 A | 6/2003 |
| JP | 2004-027403 A | 1/2004 |
| JP | 2004-300617 A | 10/2004 |
| JP | 2010-031424 A | 2/2010 |
| JP | 2010-126832 A | 6/2010 |
| JP | 2012-041658 A | 3/2012 |

OTHER PUBLICATIONS

Maximum Bubble Pressure Method, Wikipedia, the free encyclopedia, retrieved Aug. 20, 2014.
Bubble Pressure Tensiometer, KRUSS GmbH, www.kruss.de, retrieved Aug. 20, 2014.
Office Action of the corresponding Chinese Patent Application No. 201380016248.0, dated Jul. 22, 2015.

*Primary Examiner* — Vickey Nerangis
(74) *Attorney, Agent, or Firm* — Global IP Counselors, LLP

(57) ABSTRACT

A sizing agent for a reinforcement fiber is used for reinforcing thermoplastic matrix resins and spreads on the reinforcement fiber surface and imparts both excellent splittability and bonding performance to thermoplastic matrix resins. The sizing agent includes essentially an ester compound (A) having a vinyl ester group, acrylate group or methacrylate group bonded to at least one of the chain ends of the main chain of the ester compound (A), and of a polyoxyalkylene alkyl ether (B) which is an adduct between an alkylene oxide and a $C_{4-14}$ monohydric alcohol. When water is added to the sizing agent thereby producing a mixture with a nonvolatile content of 1 weight %, the mixture exhibits a dynamic surface tension ranging from 40 to 55 mN/m determined by the maximum bubble pressure method when bubbles are blown into the mixture at the rate of one bubble per 100 milliseconds.

15 Claims, No Drawings

SIZING AGENT FOR REINFORCEMENT FIBERS, AND APPLICATION THEREOF

TECHNICAL FIELD

The present invention relates to a sizing agent for a reinforcement fiber and application thereof. Specifically, the present invention relates to a sizing agent for a reinforcement fiber employed in reinforcement of a thermoplastic matrix resin, a synthetic fiber strand applied with the sizing agent, and fiber-reinforced composite manufactured of the sized fiber strand.

BACKGROUND ART

Fiber-reinforced composites manufactured by reinforcing plastic materials (called matrix resins) with various synthetic fibers are employed widely in automotive industry, aviation and space industry, sporting and leisure goods industry, and general industries. Fibers employed for the composites include inorganic fibers, such as carbon fiber, glass fiber and ceramic fiber, and organic fibers, such as aramid fiber, polyamide fiber and polyethylene fiber. These synthetic fibers are usually produced into continuous filament, and later processed into various forms of reinforcement textiles with advanced techniques, including a sheeted intermediate material called unidirectional prepreg which is manufactured by applying hot melt resin to fabric and winding it onto a drum, textile material manufactured by filament winding, and sometimes woven fabric or chopped fiber.

Reinforcement fibers are often used in a form of chopped fiber cut into 1 to 15 mm long for manufacturing fiber-reinforced composites of thermoplastic resins, such as polyolefin resins, polyamide resins, polycarbonate resins, polyacetal resins, ABS resins, polyphenylene sulfide resins and polyetherimide resins, which are included in the matrix resins mentioned above and attract attention because of their good moldability and advantages in recycling. The chopped fiber should have sufficient cohesion when it is knead with a thermoplastic resin to be manufactured into pellets, because chopped fiber having insufficient cohesion may be fed inconstantly to pellet manufacturing or break to deteriorate the properties of resultant fiber-reinforced composites. For preventing such troubles, numbers of techniques for coating reinforcement fibers with sizing agents formulated of various thermoplastic resins as a main component have been proposed in order to impart optimum cohesion to reinforcement fibers (for example, see Japanese patent documents JP-A-06-002274, JP-A-2002-138370 and JP-A-2003-165849 and widely employed in industrial fields.

Recently, reinforcement fibers are increasingly processed into a form called filament pellet or into a unidirectional sheet, tape or fabric to be impregnated with thermoplastic resins and molded in subsequent processes similarly to composite materials of thermosetting resins, in order to effectively achieve desirable properties of reinforcement fibers including tensile strength. In such cases, hot-melt thermoplastic resins should rapidly penetrate into fiber strands, specifically, fill space between single fibers when a fiber-reinforced composite is molded, in order to shorten molding time and improve the physical properties of resultant composites.

Sizing agents in prior art have posed problems relating to insufficient performances of sizing agents including low bonding strength between a matrix resin and sized reinforcement fiber due to insufficient heat resistance of the sizing agent or poorly impregnated reinforcement fiber with a matrix resin.

More serious problem relating to conventional sizing agents is low bonding strength between a matrix resin and sized reinforcement fiber caused by nonuniform coating on the reinforcement fiber with a sizing agent, in other words, slow penetration of a sizing agent into fiber strand leading to nonuniform spreading of the sizing agent between single fibers or on fiber surface. In addition, conventional sizing agents form a strong film on fiber surface to make sized fiber strands poorly splittable, and thus disturb quick splitting of sized reinforcement fiber strands at guide bars in warping before sized reinforcement fiber strands are processed into unidirectional sheet or woven fabric. Such sizing agents have also caused other problems including stiffly sized reinforcement fiber strands which cannot be easily wound into packages, or the deformation of packages of sized reinforcement fiber strands during transportation.

SUMMARY OF INVENTION

Technical Problem

Considering the conventional technical background, the present invention aims to provide a sizing agent which uniformly coats reinforcement fiber and imparts, to reinforcement fiber, both excellent splittability and bonding performance to thermoplastic matrix resins, and a synthetic fiber strand and fiber-reinforced composite manufactured therewith.

Solution to Problem

The inventors of the present invention diligently studied to solve the problems mentioned above, and attained the present invention with the finding that a sizing agent for a reinforcement fiber containing a specific component and exhibiting a certain range of dynamic surface tension determined under a certain condition can solve the problem.

In other words, the present invention provides a sizing agent for a reinforcement fiber used to reinforce a thermoplastic matrix resin. The sizing agent comprising essentially an ester compound (A) having a vinyl ester group, acrylate group or methacrylate group bonded to at least one of the chain ends of the main chain of the ester compound (A), and a polyoxyalkylene alkyl ether (B) being an adduct between an alkylene oxide and a $C_{4-14}$ monohydric alcohol; wherein, when water is added to the sizing agent thereby producing a mixture with a nonvolatile content of 1 weight %, the mixture exhibits a dynamic surface tension ranging from 40 to 55 mN/m determined by the maximum bubble pressure method where gas bubbles are blown into the mixture at the rate of one bubble per 100 milliseconds.

The weight ratio of the ester compound (A) ranges from 10 to 99 wt % of the nonvolatile components of the sizing agent, and the weight ratio of the polyoxyalkylene alkyl ether (B) ranges from 0.5 to 10 wt % of the nonvolatile components of the sizing agent.

In addition, the sizing agent of the present invention should preferably comprise at least one resin selected from a group consisting of an aromatic polyester-polyurethane resin (C) and an aromatic polyester resin (D). The weight ratio of the sum of the ester compound (A) and the resin ranges from 60 to 99 wt % of the nonvolatile components of the sizing agent, and the weight ratio of the polyoxyalkylene alkyl ether (B) ranges from 0.5 to 10 wt % of the nonvolatile components of the sizing agent.

The thermoplastic matrix resin mentioned above should preferably be a polyamide resin.

The thermal weight loss of the nonvolatile components of the sizing agent is not more than 10 wt % when the nonvolatile components are heated to 300° C.

The synthetic fiber strand of the present invention is manufactured by applying the sizing agent for a reinforcement fiber to a base synthetic fiber strand.

The synthetic fiber constituting the fiber strand should preferably be at least one fiber selected from a group consisting of carbon fiber, aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber.

The fiber-reinforced composite of the present invention contains a thermoplastic matrix resin and the synthetic fiber strand mentioned above.

Advantageous Effects of Invention

The sizing agent for a reinforcement fiber of the present invention spreads uniformly on reinforcement fiber and imparts, to the reinforcement fiber, both excellent splittability and bonding performance to a thermoplastic matrix resin.

The synthetic fiber strand of the present invention is uniformly coated with the sizing agent for a reinforcement fiber, and has both excellent splittability and bonding performance to a thermoplastic matrix resin. The synthetic fiber strand of the present invention enables the production of a fiber-reinforced composite having excellent properties.

MODE FOR CARRYING OUT THE INVENTION

The present invention provides a sizing agent for a reinforcement fiber used to reinforce a thermoplastic matrix resin. The sizing agent comprises essentially an ester compound (A) and a polyoxyalkylene alkyl ether (B) which is an alkylene oxide adduct of a $C_{4-14}$ monohydric alcohol, and exhibits a dynamic surface tension ranging from 40 to 55 mN/m determined under a certain condition. The detailed description of the sizing agent is given below.

Ester Compound (A)

The sizing agent of the present invention comprises essentially an ester compound (A) having a vinyl ester, acrylate or methacrylate group bonded to at least one of the ends of the main chain of the ester compound (A). The ester compound (A) has a highly reactive double bond and may be any of aromatic and aliphatic ester compounds. One of or a combination of at least two of the ester compounds (A) may be used. The vinyl ester group represents $CH_2=CHOCO-$, the acrylate group represents $CH_2=CHCOO-$, and methacrylate group represents $CH_2=CCH_3COO-$.

The ester compound (A) includes, for example, alkyl (meth)acrylate, alkoxypolyalkylene glycol (meth)acrylate, benzyl (meth)acrylate, phenoxyethyl (meth)acrylate, 2-hydroxyalkyl (meth)acrylate, dialkylaminoethyl (meth)acrylate, glycidyl (meth)acrylate, 2-methacryloyloxyethyl 2-hydroxypropyl phthalate, polyalkylene glycol di(meth)acrylate, alkanediol di(meth)acrylate, glycerin di(meth)acrylate, 2-hydroxy-3-acryloyloxypropyl (meth)acrylate, dimethylol-tricyclodecane di(meth)acrylate, bisphenol A (meth)acrylate, alkylene oxide adduct of bisphenol A (meth)acrylate, bisphenol A diglycidyl ether (meth)acrylate, alkylene oxide adduct of bisphenol A diglycidyl ether (meth)acrylate, trimethylol propane tri(meth)acrylate, glycidyl (meth)acrylate, phenoxyalkyl (meth)acrylate, phenoxy polyalkylene glycol (meth) acrylate, 2-hydroxy-3-phenoxypropanol (meth)acrylate, polyalkylene glycol nonylphenyl ether (meth)acrylate, 2-(meth)acryloyloxyethyl succinic acid, 2-(meth)acryloyloxyethyl phthalic acid, 2-(meth)acryloyloxyethyl-2-hydroxyethyl-phthalic acid, neopentyl glycol (meth)acrylic acid benzoate, alkylene oxide adduct of trimethylol propane tri(meth)acrylate, pentaerythritol tri(meth)acrylate, pentaerythritol tetra(meth)acrylate, dipentaerythritol hexa(meth) acrylate, and pentaerythritol tri(meth)acrylate hexamethylene diisocyanate urethane prepolymer.

Of those esters, 2-methacyloyloxyethyl 2-hydroxypropyl phthalate, polyalkylene glycol di(meth)acrylate, 2-(meth) acryloyloxyethyl phthalic acid, 2-(meth)acryloyloxyethyl-2-hydroxyethyl-phthalic acid, neopentylglycol (meth)acrylic acid benzoate, bisphenol A (meth)acrylate, alkylene oxide adduct of bisphenol A (meth)acrylate, bisphenol A diglycidyl ether (meth)acrylate and alkylene oxide adduct of bisphenol A diglycidyl ether (meth)acrylate are preferable for the ester compound (A), and polyalkylene glycol di(meth)acrylate, bisphenol A (meth)acrylate, alkylene oxide adduct of bisphenol A (meth)acrylate, bisphenol A diglycidyl ether (meth) acrylate and alkylene oxide adduct of bisphenol A diglycidyl ether (meth)acrylate are more preferable.

Polyoxyalkylene Alkyl Ether (B)

The sizing agent of the present invention comprises essentially a polyoxyalkylene alkyl ether (B) which is an alkylene oxide adduct of a $C_{4-14}$ monohydric alcohol. One of or a combination of at least two of polyoxyalkylene ethers (B) may be employed. The production method for the polyoxyalkylene alkyl ether (B) is not specifically restricted and any known methods are employable.

The $C_{4-14}$ monohydric alcohol may be any of linear, branched or cyclic (alicyclic or araliphatic) alcohols and may be saturated or unsaturated. The linear saturated $C_{4-14}$ monohydric alcohols include butyl alcohol, hexyl alcohol, octyl alcohol, decyl alcohol, lauryl (dodecyl) alcohol and tetradecyl alcohol. The branched saturated $C_{4-14}$ monohydric alcohols include 2-ethylhexyl alcohol. The cyclic $C_{4-14}$ monohydric alcohols include cyclohexyl alcohol and benzyl alcohol. Of those alcohols, linear or branched saturated $C_{6-12}$ monohydric alcohols are preferable for uniform application of the resultant sizing agent, and hexyl alcohol and 2-ethylhexyl alcohol are more preferable.

The alkylene oxide mentioned above should preferably be $C_{2-4}$ alkylene oxide, specifically, ethylene oxide (hereinafter also referred to as EO), propylene oxide (hereinafter also referred to as PO) and 1,2-, 1,3- 2,3- or 1,4 butylene oxide (hereinafter also referred to as BO). A combination of at least two of those alkylene oxides may be used. Of those alkylene oxides, EO and/or PO are preferable for uniform application of the resultant sizing agent. A combination of at least two of those alkylene oxides may be added to the monohydric alcohol by random or block copolymerization or by the combination of those two polymerization methods, and block copolymerization or random copolymerization followed by block copolymerization is preferable.

The mole number of the alkylene oxide added to the monohydric alcohol should preferably range from 1 to 12, more preferably from 1 to 10, and further more preferably from 1 to 8 for uniform application of the resultant sizing agent.

The weight-average molecular weight of the polyoxyalkylene alkylether (B) should preferably range from 200 to 2000, more preferably from 250 to 1800, and further more preferably from 280 to 1500.

Resin

The sizing agent of the present invention should preferably contain at least one resin selected from a group consisting of an aromatic polyester-polyurethane resin (C) and an aromatic polyester resin (D). The sizing agent containing the resin in addition to the ester compound (A) and polyoxyalkylene alkyl ether (B) and exhibiting a certain range of dynamic surface tension mentioned later can further improve bonding between a thermoplastic matrix resin and sized reinforcement fiber, especially in the case that a polyamide resin is employed for the thermoplastic matrix resin. Of those resins, an aromatic polyester-polyurethane resin (C) is preferable.

The aromatic polyester-polyurethane resin (C) is a polymer produced by addition polymerization of an aromatic polyester polyol and polyisocyanate. The aromatic polyester-polyurethane resin (C) should preferably have a hydrophilic group in its molecular framework including the chain ends in order to be self-emulsifiable, because a sizing agent of the present invention containing such resin can be made into an aqueous emulsion without emulsifiers such as surfactants. The hydrophilic group includes, for example, polyalkylene oxides, sulfonate salts, carboxyl group and their neutralization salts. The method for producing the aromatic polyester-polyurethane resin (C) is not specifically restricted, and known methods may be employed. One of or a combination of at least two aromatic polyester-polyurethane resins (C) may be employed.

The aromatic polyester polyol is a copolymer of a polycarboxylic acid or its anhydride and a polyol, and at least one of the polycarboxylic acid, its anhydride and a polyol contains an aromatic compound.

The polycarboxylic acid includes, for example, aromatic dicarboxylic acids, sulfonate salt-containing aromatic dicarboxylic acids, aliphatic dicarboxylic acids, alicyclic dicarboxylic acids and polycarboxylic acids having at least three functional groups.

The aromatic dicarboxylic acids include phthalic acid, terephthalic acid, isophthalic acid, orthophthalic acid, 1,5-naphthalene dicarboxylic acid, 2,6-naphthalene dicarboxylic acid, diphenyl dicarboxylic acid, diphenoxyethane dicarboxylic acid and phthalic anhydride.

The sulfonate salt-containing aromatic dicarboxylic acids include sulfoterephthalate salt and 5-sulfoisophthalate salt.

The aliphatic dicarboxylic acids and alicyclic dicarboxylic acids include fumaric acid, maleic acid, itaconic acid, succinic acid, adipic acid, azelaic acid, sebacic acid, dimer acid, 1,4-cyclohexane dicarboxylic acid, succinic anhydride and maleic anhydride.

The polycarboxylic acids having at least three functional groups include trimellitic acid, pyromellitic acid, trimellitic anhydride and pyromellitic anhydride.

The polyol includes, for example, diols and polyols having at least three functional groups.

The diols include ethylene glycol, diethylene glycol, polyethylene glycol, propylene glycol, polypropylene glycol, polybutylene glycol, 1,3-propane diol, 1,4-butane diol, 1,6-hexane diol, neopentyl glycol, tetramethylene glycol, 1,4-cyclohexane diol, 1,4-cyclohexane dimethanol, resorcin, hydroquinone, bisphenol A and their alkylene oxide adducts.

The polyols having at least three functional groups include trimethylol propane, glycerin and pentaerythritol.

The polyisocyanate includes, for example, 2,4-tolylene diisocyanate, 2,6-tolylene diisocyanate, tetramethylene diisocyanate, hexamethylene diisocyanate, xylylene diisocyanate, isophorone diisocyanate and 1,5-naphthalene diisocyanate. Of those polyisocyanates, 2,4-tolylene diisocyanate, 2,6-tolylene diisocyanate, xylylene diisocyanate, isophorone diisocyanate and 1,5-naphthalene diisocyanate are preferable.

The weight-average molecular weight of the aromatic polyester-polyurethane resin (C) should preferably range from 3,000 to 100,000, and more preferably from 10,000 to 50,000. An aromatic polyester-polyurethane resin (C) having a weight-average molecular weight less than 3,000 can have poor heat resistance while an aromatic polyester-polyurethane resin (C) having a weight-average molecular weight greater than 100,000 may be made into unstable solution.

The aromatic polyester resin (D) is a copolymer of a polycarboxylic acid or its anhydride and a polyol, and at least one of the polycarboxylic acid, its anhydride and the polyol contains an aromatic compound. The aromatic polyester resin (D) should preferably have a hydrophilic group in its molecular framework including the chain ends in order to be self-emulsifiable, because a sizing agent of the present invention containing such resin can be made into an aqueous emulsion without emulsifiers such as surfactants. The hydrophilic group includes, for example, polyalkylene oxide groups, sulfonate salts, carboxyl group and their neutralization salts. The copolymer can be produced in known methods. One of or a combination of at least two of such aromatic polyester resins (D) can be used.

The polycarboxylic acid mentioned above includes aromatic dicarboxylic acids, sulfonate salt-containing aromatic dicarboxylic acids, aliphatic dicarboxylic acids, alicyclic dicarboxylic acids and polycarboxylic acids having at least three functional groups. The polycarboxylic acid includes the same as those exemplified in the description of the aromatic polyester-polyurethane resin (C) mentioned above.

The polyol mentioned above includes diols, and polyols having at least three functional groups. The polyol includes the same as those exemplified in the description of the aromatic polyester-polyurethane resin (C) mentioned above.

For producing the aromatic polyester resin (D), at least one of the polycarboxylic acid, its anhydride (both of which may be sometimes collectively referred to as all of the polycarboxylic acid components) and the polyol should preferably contain an aromatic compound. Especially an aromatic dicarboxylic acid should constitute preferably from 40 to 99 mole percent, more preferably from 80 to 99 mole percent, of all of the polycarboxylic acid components. For making stable solution of the aromatic polyester resin (D), a sulfonate salt-containing aromatic dicarboxylic acid should constitute preferably from 1 to 10 mole percent of all of the polycarboxylic acid components. Of those polycarboxylic acids and polyols exemplified above, phthalic acid, terephthalic acid, isophthalic acid, orthophthalic acid, 1,5-naphthalene dicarboxylic acid, 2,6-naphthalene dicarboxylic acid, diphenyl dicarboxylic acid, diphenoxyethane dicarboxylic acid, phthalic anhydride, sulfoterephthalate salt and 5-sulfoisophthalate salt are preferable polycarboxylic acids; and ethylene glycol, diethylene glycol, polyethylene glycol, propylene glycol, tetramethylene glycol and neopentyl glycol are preferable polyols.

The weight-average molecular weight of the aromatic polyester resin (D) should preferably range from 3,000 to 100,000, and more preferably from 10,000 to 30,000. An aromatic polyester resin (D) having a weight-average molecular weight of less than 3,000 may have poor heat resistance while an aromatic polyester resin (D) having a weight-average molecular weight of greater than 100,000 may be made into unstable solution.

Sizing Agent for Reinforcement Fiber

The sizing agent for a reinforcement fiber of the present invention comprises essentially the ester compound (A) and polyoxyalkylene alkyl ether (B), and a mixture with a non-volatile content of 1 weight % of the sizing agent exhibits a dynamic surface tension ranging from 40 to 55 mN/m determined by the maximum bubble pressure method in which gas bubbles were blown in the emulsion at the rate of one bubble per 100 milliseconds. Owing to such properties, the sizing agent quickly penetrates into a reinforcement fiber strand, specifically, spreads between single fibers of the strand and uniformly coats fiber surface to improve bonding between a matrix resin and the sized reinforcement fiber strand. Also the sizing agent imparts, to a reinforcement fiber strand, both excellent splittability and bonding performance to a matrix resin. In addition, the sizing agent has improved heat resistance to minimize gas generation from thermal decomposition of the sizing agent in heat treatment of a thermoplastic matrix rein and sized reinforcement fiber strand at high temperature.

If a mixture with a nonvolatile content of 1 weight % of the sizing agent exhibits a dynamic surface tension greater than 55 mN/m in the determination mentioned above, such sizing agent cannot uniformly coat a reinforcement fiber strand and thus results in poor bonding between a thermoplastic matrix resin and the sized reinforcement fiber. On the other hand, if a mixture with a nonvolatile content of 1 weight % of the sizing agent exhibits a dynamic surface tension smaller than 40 mN/m in the determination, such sizing agent may cause difficulty in controlling the amount of the sizing agent applied to a reinforcement fiber. The dynamic surface tension of a mixture with a nonvolatile content of 1 weight % of the sizing agent determined in the method mentioned above should preferably range from 40 to 55 mN/m, more preferably from 41 to 54 mN/m, further more preferably from 42 to 53 mN/m and most preferably from 43 to 52 mN/m. The nonvolatile components of the sizing agent of the present invention means the residue after heating the sizing agent at 105° C. to remove the solvent and heating to constant weight.

A sizing agent which further contains at least one resin selected from the group consisting of the aromatic polyester-polyurethane resin (C) and aromatic polyester resin (D) in addition to the ester compound (A) and polyoxyalkylene alkyl ether (B) and exhibits a dynamic surface tension within the range mentioned above attains better bonding between a thermoplastic matrix resin and sized reinforcement fiber than the bonding attained by a sizing agent containing only the ester compound (A) and polyoxyalkylene alkyl ether (B), especially in the case that the thermoplastic resin is a polyamide resin.

The weight ratio of the ester compound (A) to the nonvolatile components of the sizing agent should preferably range from 10 to 99 wt %, more preferably from 30 to 98 wt %, and further more preferably from 50 to 97 wt %. A sizing agent in which the nonvolatile components contain less than 10 wt % of the ester compound (A) is poorly heat resistant and generates thermal decomposition gas in heat treatment of a thermoplastic matrix resin and sized reinforcement fiber strand at high temperature to possibly cause poor bonding between the thermoplastic matrix resin and sized reinforcement fiber strand. On the other hand, a sizing agent in which the nonvolatile components contain more than 99 wt % of the ester compound (A) is nonuniformly applied to a reinforcement fiber strand and may impair bonding between a thermoplastic matrix resin and sized reinforcement fiber strand.

The weight ratio of the polyoxyalkylene alkyl ether (B) to the nonvolatile components of the sizing agent should preferably range from 0.5 to 10 wt %, more preferably from 1 to 8 wt %, and further more preferably from 3 to 5 wt %. A sizing agent in which the nonvolatile components contains less than 0.1 wt % of the polyoxyalkylene alkyl ether (B) is nonuniformly applied to a reinforcement fiber strand and can impair bonding between a thermoplastic matrix resin and sized reinforcement fiber strand. On the other hand, a sizing agent in which the nonvolatile components contain more than 10 wt % of the polyoxyalkylene alkyl ether (B) may cause bleeding out of the polyoxyalkylene alkyl ether (B) on the surface of size film coating reinforcement fiber strand and impair bonding between a thermoplastic matrix resin and sized reinforcement fiber strand.

The weight ratio of the resins to the nonvolatile components of the sizing agent of the present invention should preferably range from 10 to 89 wt %, more preferably from 20 to 80 wt %, and further more preferably from 30 to 60 wt %, in the case that the resins are contained in the sizing agent. A sizing agent in which the nonvolatile components contain more than 89 wt % of the resins is poorly heat resistant and generates thermal decomposition gas in heat treatment of a thermoplastic matrix resin and sized reinforcement fiber strand at high temperature to possibly impair bonding between the thermoplastic matrix resin and sized reinforcement fiber strand.

The weight ratio of the ester compound (A) to the nonvolatile components of the sizing agent containing the resins should preferably range from 10 to 89 wt %, more preferably from 20 to 80 wt %, and further more preferably from 40 to 70 wt %.

The weight ratio between the ester compound (A) and the resins should preferably range from 10:90 to 90:10, more preferably from 70:30 to 30:70, and further more preferably from 40:60 to 60:40 for better effect of the present invention.

For the purpose of improving uniformity of the sizing agent on reinforcement fiber strand and bonding between a thermoplastic matrix resin and sized reinforcement fiber strand, the weight ratio of the ester compound (A) to the nonvolatile ingredient of the sizing agent without containing the resins should preferably ranges from 60 to 99 wt %, more preferably from 70 to 98 wt %, and further more preferably from 75 to 97 wt %. In the case of a sizing agent containing the resins, the total of the weight ratios of the ester compound (A) and the resins to the nonvolatile ingredient of the sizing agent should preferably range from 60 to 99 wt %, more preferably from 70 to 98 wt %, and further more preferably from 75 to 97 wt %.

The sizing agent of the present invention may contain water for the safety of workers using the sizing agent, prevention of disasters including fires, and prevention of the pollution in natural environment. In addition, the sizing agent may contain an organic solvent, such as methyl alcohol, ethyl alcohol, isopropyl alcohol, acetone and methylethyl ketone, in an amount which will not adversely affect the effect of the present invention.

The ester compound (A) in the sizing agent of the present invention self-emulsifies and/or is dispersed and emulsified in water. The mean particle size of the ester compound (A) in water is not specifically restricted but should preferably range from 0.03 to 10 μm, more preferably from 0.05 to 5 μm, and further more preferably from 0.1 to 1 μm. An ester compound (A) dispersed into particles of a mean particle size smaller than 0.03 μm in water can permeate through a reinforcement fiber strand and inhibit the application of the resultant sizing agent to a target amount on a reinforcement fiber strand. On the other hand, an ester compound (A) dispersed into particles of a mean particle size greater than 10 μm in water cannot be applied uniformly on a reinforcement fiber strand and the resultant sizing agent can separate within several days, in other words, may have poor stability during storage and not be suitable for practical use.

The aromatic polyester-polyurethane resin (C) and the aromatic polyester resin (D) in the sizing agent of the present invention self-emulsify and/or are dispersed and emulsified in water. The mean particle sizes of the aromatic polyester-polyurethane resin (C) and aromatic polyester resin (D) in water are not specifically restricted but should preferably range from 0.03 to 10 µm, more preferably from 0.05 to 5 µm or smaller, and further more preferably from 0.1 to 1 µm. An aromatic polyester-polyurethane resin (C) and aromatic polyester resin (D) dispersed into particles of a mean particle size smaller than 0.03 µm in water can permeate through a reinforcement fiber strand and inhibit the application of the resultant sizing agent to a target amount on a reinforcement fiber strand. On the other hand, an aromatic polyester-polyurethane resin (C) and aromatic polyester resin (D) dispersed into particles of a mean particle size greater than 10 µm in water cannot be applied uniformly on a reinforcement fiber strand and the resultant sizing agent may separate within several days, in other words, may have poor stability during storage and not be suitable for practical use.

The mean particle size mentioned in the present invention is the mean value calculated from the particle size distribution determined with a laser diffraction/scattering particle size distribution measurement apparatus (LA-910, produced by Horiba, Ltd.).

The sizing agent of the present invention may contain components other than those mentioned above so far as the components will not adversely affect the effect of the present invention. Those components include surfactants, lubricants, antioxidants, flame retarders, antiseptics, crystal-nucleation agents and antifoam agents. One of or a combination of at least two of those components can be employed.

Of those components, the surfactants function as emulsifiers for the ester compound (A), polyoxyalkylene alkyl ether (B), aromatic polyester-polyurethane resin (C), aromatic polyester resin (D) and other water-insoluble or hardly water-soluble resins contained in the sizing agent of the present invention, and efficiently emulsify those components in water. The weight ratio of the surfactants to the nonvolatile components of the sizing agent should preferably range from 0.1 to 30 wt %, more preferably from 1 to 25 wt %, and further more preferably from 5 to 20 wt % for achieving heat resistance of the sizing agent.

The surfactants are not specifically restricted and can be selected from known surfactants including nonionic surfactants (except the polyoxyalkylene alkyl ether (B)), anionic surfactants, cationic surfactants and amphoteric surfactants. One of or a combination of at least two of the surfactants can be employed.

The nonionic surfactants include, for example, nonionic surfactants of alkylene oxide adducts (produced by adding an alkylene oxide, such as ethylene oxide and propylene oxide, which can be a combination of at least two variants of alkylene oxides, to higher alcohols, higher fatty acids, alkyl phenols, styrenated phenols, benzyl phenol, sorbitan, sorbitan ester, castor oil and hydrogenated castor oil; except the polyoxyalkylene alkyl ether (B)); higher fatty acid esters of polyalkylene glycol; and ethylene oxide-propylene oxide copolymers.

The anionic surfactants include, for example, carboxylates, carboxylate salts, sulfate salts of higher alcohols or higher alcohol ethers, sulfonate salts, and phosphate salts of higher alcohols or higher alcohol ethers.

The cationic surfactants include, for example, quaternary ammonium salts (such as lauryl trimethyl ammonium chloride, oleyl methylethyl ammonium ethosulfate, etc.) and amine salts (such as polyoxyethylene laurylamine lactate salt, etc.).

The amphoteric surfactants include, for example, amino acid amphoteric surfactants (such as sodium laurylamino propionate, etc.); and betaine amphoteric surfactants (such as stearyl dimethyl betaine, lauryl dihydroxyethyl betaine, etc.).

The concentration of the nonvolatile components of the sizing agent of the present invention is not specifically restricted, and selected according to the desirable stability of the sizing agent in a form of aqueous dispersion and the viscosity of the sizing agent which is convenient for handling and use. The concentration of the nonvolatile components should preferably range from 10 to 100 wt %, more preferably from 20 to 100 wt %, and further more preferably from 40 to 100 weight percent, considering the transportation cost of the sizing agent.

The total of the weight ratios of water and the nonvolatile components in the sizing agent should preferably be at least 90 wt %, more preferably at least 95 wt %, further more preferably at least 99 wt %, and most preferably 100 wt %. A sizing agent containing water and the nonvolatile components in an amount of less than 90 wt %, in other words, a sizing agent containing the organic solvents mentioned above and other low-boiling-point compounds, which do not remain as nonvolatile components on a reinforcement fiber strand after heat treatment, in an amount greater than 10 wt %, may not be preferable for the safety of workers using the sizing agent and prevention of the pollution in natural environment.

The thermal weight loss of the nonvolatile components of the sizing agent for a reinforcement fiber of the present invention determined at 300° C. with a differential thermogravimetric analyzer (TG-DTA) should preferably be not more than 10 wt %, more preferably not more than 8 wt %, and furthermore preferably not more than 5 wt %. Nonvolatile components resulting in a thermal weight loss greater than 10 wt % at 300° C. can lead to poor bonding between a thermoplastic matrix resin and sized reinforcement fiber strand due to gas generated from thermal decomposition of the nonvolatile components.

The sizing agent in a form of aqueous dispersion or solution should preferably contain no solvents other than water, such as organic solvents, or should contain preferably not more than 10 wt %, more preferably not more than 5 wt %, and further more preferably not more than 1 wt % of such solvents, for the purpose of preventing viscosity increase and solidification of the sizing agent during storage, in addition to securing the safety of workers using the sizing agent and preventing the pollution in natural environment.

The method for producing the sizing agent of the present invention is not specifically restricted and known methods can be employed. Those methods include, for example, a method in which each of the components constituting the sizing agent is added to warm water with agitation to be dispersed and emulsified, and a method in which each of the components are mixed, heated to a temperature above their softening points, agitated in a homogenizer, mixer or ball mill with mechanical shear, and emulsified through phase inversion by gradually adding water.

Synthetic Fiber Strand and Production Process Thereof

The synthetic fiber strand of the present invention is produced by applying the sizing agent for a reinforcement fiber to a base synthetic fiber strand, and used for reinforcing a thermoplastic matrix resin. The synthetic fiber strand of the present invention exhibits excellent bonding performance to a thermoplastic matrix resin owing to the sizing agent of the present invention uniformly spreading between single fibers and on fiber surface. The synthetic fiber strand can split easily in addition to the excellent bonding performance to a thermoplastic matrix resin. The sizing agent for a reinforcement fiber has excellent heat resistance and minimizes its thermal decomposition in heat treatment of a thermoplastic matrix resin and sized synthetic fiber strand at high temperature so as to prevent impaired bonding between a thermoplastic matrix resin and sized synthetic fiber strand usually caused by thermal decomposition of a sizing agent.

The amount of the nonvolatile components of the sizing agent applied to a base synthetic fiber strand can be optionally selected according to the functions required for the sized synthetic fiber strand. The amount of the nonvolatile components preferably ranges from 0.1 to 20 wt % of a base synthetic fiber strand. For applying the sizing agent to a continuous filament strand of synthetic fiber, the amount of the nonvolatile components should preferably range from 0.1 to 10 wt %, and more preferably from 0.5 to 5 wt % of the base synthetic fiber strand. For applying the sizing agent to chopped synthetic fiber strand (fiber strand cut into a desirable length), the amount of the nonvolatile components should preferably range from 0.5 to 20 wt %, and more preferably from 1 to 10 wt % of the chopped fiber strand.

Insufficient amount of the sizing agent on a synthetic fiber strand may result in poor effect of the present invention for achieving high heat resistance of the sized synthetic fiber strand, sufficient impregnation of the sized synthetic fiber strand with a matrix resin and good bonding between the sized synthetic fiber strand and a matrix resin. In addition, insufficient amount of the sizing agent on a synthetic fiber strand may fail to impart sufficient cohesion to the synthetic fiber strand to cause poor handling property of the fiber strand. On the other hand, excessive amount of the sizing agent on synthetic fiber strand is not advantageous, because such sized synthetic fiber strand may become too rigid and have poor handling property, and may be impregnated insufficiently with a matrix resin in molding a fiber-reinforced composite.

The process for producing the synthetic fiber strand of the present invention includes the steps of preparing a treatment liquid of the sizing agent in which the nonvolatile components of the sizing agent constitute 0.5 to 10 wt % of the treatment liquid and the total of the nonvolatile components and water constitutes at least 90 wt % of the treatment liquid; and applying the treatment liquid to a base synthetic fiber strand to coat the strand with the nonvolatile components of the sizing agent in an amount of 0.1 to 20 wt % of fiber weight.

The weight ratio of the nonvolatile components of the sizing agent contained in the treatment liquid should preferably range from 0.5 to 10 wt %, and more preferably from 1 to 5 wt %. The total of the weight ratios of the nonvolatile components and water in the treatment liquid should preferably be at least 95 wt %, more preferably at least 99 wt %, and most preferably 100 wt %.

The preferable amount of the nonvolatile components of the sizing agent to be applied to a synthetic fiber strand in the size application step is as described above. The method for applying the sizing agent to a base synthetic fiber strand is not specifically restricted and any known methods including application with kiss rolls, dipping with rollers, and spraying can be employed. Of those methods, dipping with rollers is preferable for uniform size application on a base synthetic fiber strand.

The drying method for the sized synthetic fiber strand is not specifically restricted, and the sized synthetic fiber strand can be heated and dried with heater rollers, hot airs, or hot plates.

For applying the sizing agent of the present invention to a base synthetic fiber strand, all of the components of the sizing agent can be blended before applying to the base synthetic fiber strand, or the components can be separately applied to the base synthetic fiber strand in two or more stages. In addition, thermosetting resins such as epoxy resins and phenol resins and/or thermoplastic resins other than the polymer components used in the present invention such as polyurethane resins, polyester resins, nylon resins and acrylate resins can be applied to the base synthetic fiber strand in an amount which does not deteriorate the effect of the present invention.

The synthetic fiber strand of the present invention is used as a reinforcement fiber for a composite containing a thermoplastic resin as the matrix. The form of the reinforcement fiber may be continuous filament or chopped fiber, and continuous filament is preferable because sized continuous filament strands easily split and exhibit excellent bonding performance to matrix resins.

The base synthetic fibers to be applied with the sizing agent of the present invention include inorganic fibers such as carbon fiber, glass fiber and ceramic fiber; and organic fibers such as aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber. Of those fibers, at least one selected from the group consisting of carbon fiber, aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber is preferable, considering the properties of a resultant fiber-reinforced composite, and carbon fiber is more preferable.

Fiber Reinforced Composite

The fiber-reinforced composite of the present invention contains a thermoplastic matrix resin and the synthetic fiber strand mentioned above as the reinforcement fiber. The synthetic fiber strand is uniformly applied with the sizing agent of the present invention to have good affinity to a thermoplastic matrix resin and is manufactured into fiber-reinforced composite in which the reinforcement fiber and a matrix resin are bonded firmly. In addition, minimized thermal decomposition of the sizing agent in high-temperature treatment minimizes the deterioration of bonding between the sized reinforcement fiber and a matrix resin due to thermal decomposition of the sizing agent. The thermoplastic matrix resin mentioned here means a matrix resin which may contain one of or a combination of at least two thermoplastic resins. The thermoplastic matrix resin is not specifically restricted and includes polyolefin resins, polyamide resins, polycarbonate resins, polyester resins, polyacetal resins, ABS resins, phenoxy resins, polymethyl methacrylate resins, polyphenylene sulfide resins, polyetherimide resins and polyether ketone resins. Of those thermoplastic resins, polyamide resins are preferable because bonding between polyamide resins and sized reinforcement fibers can be improved by the sizing agent of the present invention more effectively than the bonding between other resins and sized reinforcement fibers. The polyamide resins mentioned here include a homopolymer or copolymer which is synthesized from dibasic fatty acids, diamines, ω-amino acid, lactam and their derivatives and has a plurality of amide groups in the main chain of the homopolymer or copolymer. The polyamide resins also include modified polymers in which a substituent is introduced in the main chain or chain ends.

A part of or whole of the thermoplastic matrix resin can be modified in order to improve bonding between the matrix resin and a synthetic fiber strand.

The manufacturing method of the fiber-reinforced composite is not specifically restricted, and various known methods including injection molding with a compound containing chopped fiber or filament pellet, pressure molding with UD (unidirectional) sheet or fabric sheet, and molding with wound filament may be employed.

For kneading a reinforcement fiber and a thermoplastic matrix resin having high melting point, such as, general-purpose engineering plastics or super engineering plastics, the plastic is knead with a reinforcement fiber at a temperature higher than the melting point of the plastic within a range from 200 to 400° C. to be manufactured into a fiber-reinforced composite.

The amount of a synthetic fiber strand contained in a fiber-reinforced composite is not specifically restricted and optionally selected according to the variant and form of the fiber strand and the variant of the matrix resin. The amount of a synthetic fiber strand in a fiber-reinforced composite should preferably range from 5 to 70 wt %, and more preferably from 20 to 60 wt %.

EXAMPLE

The present invention is specifically explained with the following examples, though the present invention is not restricted within the scope of the examples. The percentage and parts mentioned in the following examples respectively mean wt % (weight percent) and parts by weight unless otherwise specified. The properties were measured in the methods described below.

Dynamic Surface Tension

A sizing agent was diluted with water into an aqueous solution containing 1 wt % of nonvolatile components. The dynamic surface tension of the aqueous solution was measured with a bubble pressure tensiometer (BP-2, produced by Krüss) at 25° C. by blowing bubbles into the aqueous solution at a rate ranging from one bubble per 20 to 1000 milliseconds (at the bubble plate), and the dynamic surface tension measured by forming one bubble per 100 milliseconds (at the bubble plate) was determined.

Bonding

The bonding between a sized synthetic fiber strand and matrix resin was evaluated by measuring their bonding strength by a microdroplet method with a device for measuring the interfacial properties of composite materials, HM 410 (manufactured by Toei Sangyo Co., Ltd.).

Carbon fiber filament was sampled from each of the carbon fiber strands produced in Examples and Comparative examples, and set on the device for measuring the interfacial properties of composite materials. A drop of molten polyamide resin (T-663, produced by Toyobo Co., Ltd.) was placed on the carbon fiber filament set on the device. The carbon fiber filament with the drop of the resin was taken out of the device and cooled well at room temperature to be prepared into a sample for determining the bonding strength between the carbon fiber filament and the resin. The cooled sample was again set on the device and the drop was pinched with the blades of the device. Then the carbon fiber filament on the equipment was driven at a speed of 0.06 mm/min to determine the maximum pullout load, F, required for pulling out the drop from the carbon fiber filament.

The interfacial shearing strength, τ, was calculated by the following expression to evaluate the bonding between the carbon fiber filament and the polyamide resin:

Interfacial shearing strength, $\tau(MPa)=F/\pi dl$ where F is the maximum pullout load, d is the diameter of the carbon fiber filament, and l is the drop diameter along the pulling direction.

Splittability of Sized Fiber Strand

A sizing agent was applied to a size-free carbon fiber strand (800 tex, 12000 filament count) in an amount in which the nonvolatile components of the sizing agent were contained by 2.0 wt % of the fiber weight. The splittability of the sized carbon fiber strand (about 50 cm long) was measured by a handle-o-meter (HOM-2, manufactured by Daiei Kagaku Seiki MFG. Co., Ltd.) with a 5-mm wide slit. The mean value was calculated from the result of 10 times of measurements, and a sized carbon fiber strand exhibiting smaller mean value was determined to have better splittability.

Criteria

⊚: lower than 50 g, a soft sized carbon fiber strand exhibiting excellent splittability ○: 50 g to 60 g, a soft sized carbon fiber strand exhibiting good splittability x: higher than 60 g, a stiff sized carbon fiber strand exhibiting poor splittability Thermal Weight Loss A sizing agent was heated at 105° C. to remove solvents and further heated to constant weight to obtain the nonvolatile components of the sizing agent. About 4 mg of the nonvolatile components was placed in an aluminum pan of known weight and accurately weighed (W1). The aluminum pan containing the nonvolatile components was set in a differential thermogravimetric analyzer (TG-8120, manufactured by Rigaku Corporation) and heated in the air at a temperature being elevated from 25° C. to 500° C. at the rate of 20° C./min, and the weight of the nonvolatile ingredient at 300° C. was measured (W2). The thermal weight loss of the nonvolatile components was calculated by the following expression.

Thermal weight loss $(\%)=((W1-W2)/W1)\times 100$

Mean Particle Size

A sizing agent was diluted with water to be prepared into an aqueous dilution having a transmittance of 70% or higher. The mean particle size of the sizing agent in the aqueous dilution was calculated from the particle size distribution determined with a laser diffraction/scattering particle size distribution measurement apparatus (LA-910, produced by Horiba, Ltd.).

Examples of Producing Aqueous Dispersions A1 to A4 of the Ester Compound (A)

Example of Production A1

A uniform aqueous aqueous dispersion A1 of bisphenol A diglycidyl ether acrylate was prepared by charging a composition consisting of 80:20 weight ratio of the bisphenol A diglycidyl ether acrylate and 150-mol EO adduct of hydrogenated castor oil ether in an emulsification device and emulsifying the composition through phase inversion emulsification by gradually adding water. The aqueous dispersion A1 contained 40 wt % of nonvolatile components.

The mean particle size of the ester compound in the aqueous dispersion A1 was measured to be 0.19 μm and the aqueous dispersion A1 was stable enough without forming clumps or scum during storage at 50° C. for 1 month.

Example of Production A2

An aqueous dispersion A2 of 4-mol EO adduct of bisphenol A acrylate was prepared in the same manner as that in Example of production A1 except that the 4-mol EO adduct of bisphenol A acrylate was used instead of the bisphenol A diglycidyl ether acrylate. The aqueous dispersion A2 contained 40 wt % of nonvolatile components.

The mean particle size of the ester compound in the aqueous dispersion A2 was measured to be 0.25 μm and the aqueous dispersion A2 was stable enough without forming clumps or scum during storage at 50° C. for 1 month.

Example of Production A3

A uniform aqueous dispersion A3 of 2-acryloiloxyethyl-2-hydroxyethyl-phthalic acid was prepared by charging a composition consisting of 70:20:10 weight ratio of 2-acryloiloxy-ethyl-2-hydroxyethyl-phthalic acid, 150-mol EO adduct of hydrogenated castor oil ether and an EO-PO block copolymer (weight-average molecular weight of 15,000, consisting of 80:20 weight ratio of oxyethylene and oxypropylene) in an emulsification device and emulsifying the composition through phase inversion emulsification by gradually adding water. The aqueous dispersion A3 contained 40 wt % of nonvolatile components.

The mean particle size of the ester compound in the aqueous dispersion A3 was measured to be 0.29 µm and the aqueous dispersion A3 was stable enough without forming clumps or scum during storage at 50° C. for 1 month.

Example of Production A4

A uniform aqueous dispersion A4 of trimethylolpropane trimethacrylate was prepared by charging a composition consisting of 70:15:15 weight ratio of trimethylolpropane trimethacrylate, an EO-PO block copolymer (weight-average molecular weight of 15,000, consisting of 80:20 weight ratio of oxyethylene and oxypropylene) and an EO-PO block copolymer (weight-average molecular weight of 2,000, consisting of 40:60 weight ratio of oxyethylene and oxypropylene) in an emulsification device and emulsifying the composition through phase inversion emulsification by gradually adding water. The aqueous dispersion A4 contained 40 wt % of nonvolatile components.

The mean particle size of the ester compound in the aqueous dispersion A4 was measured to be 0.21 µm and the aqueous dispersion A4 was stable enough without forming clumps or scum during storage at 50° C. for 1 month.

Example of Production A6

A uniform aqueous dispersion A6 of 6-mol alkylene oxide adduct of bisphenol A methacrylate was prepared by charging a composition consisting of 80:10:10 weight ratio of 6-mol alkylene oxide adduct of bisphenol A methacrylate, an EO-PO block copolymer (weight-average molecular weight of 15,000, consisting of 80:20 weight ratio of oxyethylene and oxypropylene) and an EO-PO block copolymer (weight-average molecular weight of 2,000, consisting of 40:60 weight ratio of oxyethylene and oxypropylene) in an emulsification device and emulsifying the composition through phase inversion emulsification by gradually adding water. The aqueous dispersion A6 contained 40 wt % of nonvolatile components.

The mean particle size of the ester compound in the aqueous dispersion A6 was measured to be 0.21 µm and the aqueous dispersion A6 was stable enough without forming clumps or scum during storage at 50° C. for 1 month.

Examples of Producing Aqueous Dispersions C1 to C3 of the Aromatic Polyester-Polyurethane Resin (C)

Example of Production C1

In a reactor charged with nitrogen gas, 498 parts of terephthalic acid, 332 parts of isophthalic acid, 248 parts of ethylene glycol, 106 parts of diethylene glycol, 45 parts of tetramethylene glycol and 0.2 parts of dibutyl tin oxide were charged, and esterification was conducted at a temperature ranging from 190 to 240° C. for 10 hours to produce an aromatic polyester polyol. Then, 1000 parts of the aromatic polyester polyol was dehydrated under reduced pressure at 120° C. and cooled to 80° C., and 680 parts of methylethyl ketone was added to dissolve the polyol with agitation. Following the dissolution, 218 parts of isophorone diisocyanate and 67 parts of 2,2-dimethylol propionic acid as a chain extender were added and urethanization was conducted at 70° C. for 12 hours. After the reaction, the product was cooled to 40° C. and neutralized with 97 parts of 13.6-% ammonium aqueous solution, and 2950 parts of water was added to make an aqueous emulsion. The resultant aqueous emulsion was subjected to reduced pressure at 65° C. to distill away methylethyl ketone, and the amount of water in the emulsion was adjusted to make an aqueous dispersion C1 of an aromatic polyester-polyurethane resin containing 30 wt % of nonvolatile components.

The mean particle size of the aromatic polyester-polyurethane resin in the aqueous dispersion C1 was measured to be 0.15 µm and the aqueous dispersion C1 was stable enough without forming clumps or scum during storage at 50° C. for 1 month.

Example of Production C2

In a reactor charged with nitrogen gas, 332 parts of terephthalic acid, 332 parts of isophthalic acid, 146 parts of adipic acid, 258 parts of ethylene glycol, 106 parts of diethylene glycol, 52 parts of neopentyl glycol and 0.2 parts of dibutyl tin oxide were charged, and esterification was conducted at a temperature ranging from 190 to 240° C. for 10 hours to produce an aromatic polyester polyol. Then, 1000 parts of the aromatic polyester polyol was dehydrated under reduced pressure at 120° C. and cooled to 80° C., and 680 parts of methylethyl ketone was added to dissolve the polyol with agitation. Following the dissolution, 160 parts of hexamethylene diisocyanate and 67 parts of 2,2-dimethylol propionic acid as a chain extender were added, and urethanization was conducted at 70° C. for 12 hours. After the reaction, the product was cooled to 40° C. and neutralized with 97 parts of 13.6-% ammonium aqueous solution, and 2870 parts of water was added to make an aqueous emulsion. The resultant aqueous emulsion was subjected to reduced pressure at 65° C. to distill away methylethyl ketone, and the amount of water in the dispersion was adjusted to make an aqueous dispersion C2 of an aromatic polyester-polyurethane resin containing 30 wt % of nonvolatile components.

The mean particle size of the aromatic polyester-polyurethane resin in the aqueous dispersion C2 was measured to be 0.10 µm and the aqueous dispersion C2 was stable enough without forming clumps or scum during storage at 50° C. for 1 month.

Example of Production C3

In a reactor charged with nitrogen gas, 730 parts of adipic acid, 495 parts of tetramethylene glycol and 0.2 parts of dibutyl tin oxide were charged, and esterification was conducted at a temperature ranging from 190 to 240° C. for 10 hours to produce an aliphatic polyester polyol. Then, 1000 parts of the aliphatic polyester polyol was dehydrated under reduced pressure at 120° C. and cooled to 80° C., and 680 parts of methylethyl ketone was added to dissolve the polyol with agitation. Following the dissolution, 60 parts of polyethylene glycol (M.W. 600), 180 parts of hexamethylene diisocyanate and 67 parts of 2,2-dimethylol propionic acid as a chain extender were added and urethanization was conducted at 70° C. for 12 hours. After the reaction, the product was cooled to 40° C. and neutralized with 97 parts of 13.6-% ammonium aqueous solution, and 2870 parts of water was added to make an aqueous emulsion. The resultant aqueous emulsion was subjected to reduced pressure at 65° C. to distill away methylethyl ketone, and the amount of water in the emulsion was adjusted to make an aqueous dispersion C3 of an aromatic polyester-polyurethane resin containing 30 wt % of nonvolatile components.

The mean particle size of the aromatic polyester-polyurethane resin in the aqueous dispersion C3 was measured to be 0.08 μm and the aqueous dispersion C3 was stable enough without forming clumps or scum during storage at 50° C. for 1 month.

Examples of Producing Aqueous Dispersions D1 and D2 of the Aromatic Polyester Resin (D)

Example of Production D1

In a reactor charged with nitrogen gas, 950 parts of dimethyl isophthalate, 1000 parts of diethylene glycol, 0.5 parts of zinc acetate, and 0.5 parts of antimony trioxide were charged, and transesterification was conducted at a temperature ranging from 140° C. to 220° C. for 3 hours. Then 30 parts of sodium-5-sulfoisophthalic acid was added and esterification was conducted at a temperature ranging from 220° C. to 260° C. for 1 hour followed with condensation reaction under reduced pressure at a temperature ranging from 240° C. to 270° C. for 2 hours. The resultant aromatic polyester resin consisted of the following components determined in an analysis with NMR.

Isophthalic acid: 49 mol %
Diethylene glycol: 50 mol %
Sodium-5-sulfoisophthalic acid: 1 mol %

Then 200 parts of the resultant aromatic polyester resin and 100 parts of ethylene glycol monobutyl ether were charged in an emulsification device and homogenized with agitation at a temperature ranging from 150° C. to 170° C., and 700 parts of water was gradually added with agitation to make an aqueous dispersion D1 of the aromatic polyester resin containing 20 wt % of nonvolatile components.

Example of Production D2

In a reactor charged with nitrogen gas, 760 parts of dimethyl terephthalate, 190 parts of dimethyl isophthalate, 750 parts of ethylene glycol, 250 parts of diethylene glycol, 0.5 parts of zinc acetate and 0.5 parts of antimony trioxide were charged, and transesterification was conducted at a temperature ranging from 140° C. to 220° C. for 3 hours. Then 30 parts of sodium-5-sulfoisophthalic acid was added and esterification was conducted at a temperature ranging from 220° C. to 260° C. for 1 hour followed with condensation reaction under reduced pressure at a temperature ranging from 240° C. to 270° C. for 2 hours. The resultant aromatic polyester resin consisted of the following components determined in an analysis with NMR.

Terephthalic acid: 39 mol %
Isophthalic acid: 10 mol %
Ethylene glycol: 40 mol %
Diethylene glycol: 10 mol %
Sodium-5-sulfoisophthalic acid: 1 mol %

Then 200 parts of the resultant aromatic polyester resin and 100 parts of ethylene glycol monobutyl ether were placed in an emulsification device and homogenized with agitation at a temperature ranging from 150° C. to 170° C. Then 700 parts of water was gradually added with agitation to make an aqueous dispersion D2 of the aromatic polyester resin containing 20 wt % of nonvolatile components.

Example of Producing Other Aqueous Dispersions

Example of Production PP

In an autoclave equipped with an agitator, 228 parts of a maleic-anhydride-modified polypropylene resin (graft copolymer of 95 wt % of propylene and 5 wt % of maleic anhydride, with weight average molecular weight of 30000), 57 parts of 8-mol EO adduct of oleyl ether and 15 parts of sodium hydroxide were charged and heated to 170 to 180° C. with agitation under nitrogen flux. Then 700 parts of water was gradually added with agitation and the mixture was homogenized with agitation at 170 to 180° C. for 2 hours. Then the mixture was cooled to room temperature, and the amount of the water was adjusted to make an aqueous dispersion PP of the polypropylene resin containing 30 wt % of nonvolatile components.

Example of Production EP

In an emulsification device, a composition consisting of 40:40:20 weight ratio of JER™ 1001 (a solid bisphenol A epoxy resin, with an epoxy equivalent ranging from 450 to 500, produced by Japan Epoxy Resin Ltd.), JER™ 828 (a liquid bisphenol A epoxy resin, with an epoxy equivalent ranging from 184 to 194, produced by Japan Epoxy Resin Ltd.) and 150-mol EO adduct of hydrogenated castor oil ether were charged, and emulsified by gradually adding water with agitation through phase inversion emulsification to make an aqueous dispersion EP of the epoxy resin containing 30 wt % of nonvolatile components.

Example of Production PAA

In a reactor equipped with a reflux condenser, 200 parts of N-methoxymethylated polyamide (LUCKAMIDE™ 5003, with N-methoxymethylation ratio of 30%, produced by DIC Corporation) and 800 parts of methanol were charged, and the polyamide was dissolved at 50 to 60° C. with agitation. Then 100 parts of acrylic acid and 2.4 parts of azobisisobutylonitrile were added and graft polymerization was conducted under nitrogen atmosphere at 50 to 60° C. for 4 hours. To the polymerization product, 860 parts of water and 175 parts of 13.6-% ammonium aqueous solution were added and residual methanol (0.63%) in the polymerization product was distilled away to make an aqueous dispersion PAA of a hydrophilic polyamide resin containing 20 wt % of nonvolatile components.

Examples 1 to 40 and Comparative Examples 1 to 12

The aqueous dispersions mentioned above and the components described below were mixed according to the ratios of nonvolatile components shown in Tables 1 to 4. The mixtures were agitated and diluted with water to be made into sizing agents each containing 10 wt % of nonvolatile components. The ratios of the nonvolatile components shown in Tables 1 to 4 represent the weight ratios of the components described below and the nonvolatile components in the aqueous dispersions mentioned above in the nonvolatile components of the sizing agents. For example, the ratios for the aqueous dispersions A1 to A4, A6, C1 to C3, D1, D2, PP, EP and PAA shown in Tables 1 to 4 represent the weight ratios of the nonvolatile components of the aqueous dispersions A1 to A4, A6, C1 to C3, D1, D2, PP, EP and PAA in the nonvolatile components of the sizing agents. The surface tension and thermal weight loss of the resultant sizing agents and the splittability of fiber strands applied with the sizing agents were measured according to the methods mentioned above.

Ester Compound (A)
A5: Polyalkylene glycol diacrylate, with weight-average molecular weight of 400
Polyoxyalkylene Alkyl Ether (B)
B1: Block 7-mol EO-7-mol PO adduct of isobutyl alcohol
B2: Block 1-mol EO-2-mol PO adduct of 2-ethylhexyl alcohol
B3: 8-mol EO adduct of 2-ethylhexyl alcohol
B4: 7-mol EO adduct of lauryl alcohol
Polyoxyalkylene Alkyl Ether (b)
b1: 8-mol EO adduct of oleyl alcohol
b2: Random 40-mol EO-10-mol PO adduct of stearyl alcohol A carbon fiber strand (800 tex, 12000 filament count) free of sizing agents was immersed in and impregnated with one of the sizing agents, dried in hot air at 105° C. for 15 minutes, and made into a sized carbon fiber strand to which the nonvolatile components of the sizing agent was applied in an theoretical amount of 5 wt % of the fiber weight. The bonding between the sized carbon fiber strand and a matrix resin was evaluated by the method mentioned above, and the results are shown in Tables 1 to 4.

TABLE 1

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| A1 | 97 | | | | | 97 | 97 | 99 | 95 | 92 | 90 | | | | |
| A2 | | 97 | | | | | | | | | | | | | |
| A3 | | | 97 | | | | | | | | | | | | |
| A4 | | | | 97 | | | | | | | | | | | |
| A5 | | | | | 97 | | | | | | | 99 | 95 | 92 | 90 |
| B1 | | | | | | 3 | | | | | | | | | |
| B2 | 3 | 3 | 3 | 3 | | | | 1 | 5 | 8 | 10 | | | | |
| B3 | | | | | 3 | | | | | | | 1 | 5 | 8 | 10 |
| B4 | | | | | | | 3 | | | | | | | | |
| Dynamic surface tension (mN/m) | 48.7 | 48.5 | 48.6 | 48.5 | 48.5 | 51.2 | 53.4 | 53.2 | 46.3 | 44.8 | 43.1 | 54.1 | 46.8 | 45.2 | 43.9 |
| Bonding (MPa) | 45.2 | 44.9 | 44.5 | 44.1 | 46.8 | 41.5 | 40.7 | 40.1 | 47.9 | 46.2 | 42.2 | 41.8 | 48.1 | 47.5 | 41.9 |
| Splittability | ◎ | ◎ | ◎ | ◎ | ◎ | ◎ | ◎ | ◎ | ◎ | ◎ | ◎ | ◎ | ◎ | ◎ | ◎ |
| Thermal weight loss (%) | 2.9 | 3.1 | 2.9 | 2.9 | 3.1 | 3.3 | 2.7 | 2.1 | 3.9 | 5.7 | 7.2 | 6.1 | 7.5 | 8.9 | 9.4 |

TABLE 2

| | Example | | | | | | | | | | |
|---|---|---|---|---|---|---|---|---|---|---|---|
| | 16 | 17 | 18 | 19 | 20 | 21 | 22 | 23 | 24 | 25 | 26 |
| A1 | 48 | 48 | 48 | | | | | 86 | 66 | 30 | 10 |
| A2 | | | | 48 | | | | | | | |
| A3 | | | | | 48 | | | | | | |
| A4 | | | | | | 48 | | | | | |
| A5 | | | | | | | 48 | | | | |
| B1 | | | | | | | | | | | |
| B2 | 4 | 4 | 4 | 4 | 4 | 4 | | 4 | 4 | 4 | 4 |
| B3 | | | | | | | 4 | | | | |
| B4 | | | | | | | | | | | |
| C1 | 48 | | | | | | | | | | |
| C2 | | 48 | | 48 | 48 | 48 | 48 | 10 | 30 | 66 | 86 |
| C3 | | | 48 | | | | | | | | |
| Dynamic surface tension (mN/m) | 45.9 | 45.4 | 45.1 | 45.3 | 45.4 | 45.5 | 46.1 | 46.2 | 45.9 | 44.3 | 44.1 |
| Bonding (MPa) | 48.9 | 49.2 | 49.5 | 48.9 | 48.8 | 48.5 | 49.8 | 48.1 | 48.4 | 44.2 | 40.1 |
| Splittability | ◯ | ◯ | ◎ | ◯ | ◯ | ◯ | ◯ | ◎ | ◎ | ◯ | ◯ |
| Thermal weight loss (%) | 8.1 | 8.2 | 8.3 | 8.3 | 8.2 | 8.2 | 8.4 | 7.1 | 7.9 | 8.4 | 9.8 |

TABLE 3

| | Comparative example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A1 | 100 | 97 | | 99.9 | | | | | | | | |
| A2 | | | 97 | | | | | | | | | |
| B2 | | | | 0.1 | | | 3 | | | | | |
| b1 | | 3 | | | | | | | | | | |
| b2 | | | 3 | | | | | | | | | |
| C1 | | | | | 100 | | | | | | | |
| C2 | | | | | | 100 | 97 | | | | | |
| C3 | | | | | | | | 100 | | | | |

TABLE 3-continued

|  | Comparative example | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| D1 |  |  |  |  |  |  |  |  | 100 |  |  |  |
| PP |  |  |  |  |  |  |  |  |  | 100 |  |  |
| EP |  |  |  |  |  |  |  |  |  |  | 100 |  |
| PAA |  |  |  |  |  |  |  |  |  |  |  | 100 |
| Dynamic surface tension (mN/m) | 58.6 | 57.9 | 58.2 | 57.2 | 56.5 | 57.2 | 48.5 | 56.1 | 56.9 | 57.1 | 56.8 | 56.8 |
| Bonding (MPa) | 36.9 | 36.6 | 36.8 | 36.8 | 20.7 | 20.9 | 16.9 | 23.5 | 31.5 | 20.1 | 22.6 | 24.6 |
| Splittability | ⊚ | ⊚ | ⊚ | ⊚ | X | X | X | ◯ | X | X | X | X |
| Thermal weight loss (%) | 2.1 | 2.3 | 2.2 | 2.1 | 31.5 | 31.8 | 32.4 | 25.4 | 18.9 | 15.6 | 49.7 | 39.8 |

TABLE 4

|  | Example | | | | | | | | | | | | | |
|---|---|---|---|---|---|---|---|---|---|---|---|---|---|---|
|  | 27 | 28 | 29 | 30 | 31 | 32 | 33 | 34 | 35 | 36 | 37 | 38 | 39 | 40 |
| A1 | 48 | 48 |  |  |  |  |  |  |  | 86 | 66 | 30 | 10 | 48 |
| A2 |  |  | 48 |  |  |  |  |  |  |  |  |  |  |  |
| A3 |  |  |  | 48 |  |  |  |  |  |  |  |  |  |  |
| A4 |  |  |  |  | 48 |  |  |  |  |  |  |  |  |  |
| A5 |  |  |  |  |  | 48 |  |  |  |  |  |  |  |  |
| A6 |  |  |  |  |  |  | 97 | 48 | 48 |  |  |  |  |  |
| B2 | 4 | 4 | 4 | 4 | 4 |  | 3 | 4 | 4 | 4 | 4 | 4 | 4 | 4 |
| B3 |  |  |  |  |  | 4 |  |  |  |  |  |  |  |  |
| C2 |  |  |  |  |  |  |  | 48 |  |  |  |  |  | 24 |
| D1 | 48 |  | 48 | 48 | 48 | 48 |  |  | 48 | 10 | 30 | 66 | 86 | 24 |
| D2 |  | 48 |  |  |  |  |  |  |  |  |  |  |  |  |
| Dynamic surface tension (mN/m) | 45.1 | 45.9 | 45.0 | 45.1 | 45.2 | 45.8 | 48.1 | 45.7 | 45.5 | 45.9 | 45.6 | 44.0 | 43.8 | 44.9 |
| Bonding (MPa) | 46.4 | 45.9 | 44.5 | 44.3 | 45.6 | 46.8 | 45.9 | 48.5 | 46.1 | 45.3 | 44.3 | 43.1 | 40.3 | 47.6 |
| Splittability | ◯ | ◯ | ◯ | ◯ | ◯ | ⊚ | ⊚ | ◯ | ⊚ | ⊚ | ⊚ | ◯ | ◯ | ◯ |
| Thermal weight loss (%) | 2.1 | 2.1 | 2.3 | 2.2 | 2.2 | 2.4 | 2.8 | 7.9 | 2.3 | 1.9 | 1.9 | 2.3 | 2.9 | 5.3 |

As shown in Tables 1 to 4, the fiber strands applied with the sizing agents of Examples exhibited excellent bonding performance to a thermoplastic matrix resin owing to uniform coating on the fiber strands by the sizing agents. The sizing agents achieved both excellent bonding between the sized fiber strands and a thermoplastic matrix resin and good splittability of the sized fiber strands. In addition, the sizing agents of Examples exhibited good heat resistance.

On the other hand, the fiber strands applied with the sizing agents of Comparative examples exhibited poor bonding performance to a thermoplastic matrix resin, and it implies that the sizing agents did not uniformly coat the fiber strands. The sized fiber strands exhibited poor bonding to a matrix resin and/or poor splittability to show that the sizing agents of Comparative examples failed to achieve both excellent bonding between the sized fiber strands and a matrix resin and good splittability of the sized fiber strands.

INDUSTRIAL APPLICABILITY

Fiber-reinforced composites manufactured by reinforcing thermoplastic matrix resins with reinforcement fibers are employed in automotive industry, aviation and space industry, sporting and leisure goods industry, and general industries. Fibers for the reinforcement include inorganic fibers, such as carbon fiber, glass fiber and ceramic fiber, and organic fibers, such as aramid fiber, polyamide fiber and polyethylene fiber. The sizing agent of the present invention is preferable for applying to reinforcement fibers which reinforce thermoplastic matrix resins.

The invention claimed is:

1. A sizing agent for a reinforcement fiber used to reinforce a thermoplastic matrix resin, the sizing agent comprising essentially:

an ester compound (A) having a vinyl ester group, acrylate group or methacrylate group bonded to at least one end of the ester compound (A); and
a polyoxyalkylene alkyl ether (B) being an adduct between an alkylene oxide and a $C_{4-14}$ monohydric alcohol;
wherein, when water is added to the sizing agent thereby producing a mixture with a nonvolatile content of 1 weight %, the mixture exhibits a dynamic surface tension ranging from 40 to 55 mN/m determined by the maximum bubble pressure method where gas bubbles are blown into the mixture at the rate of one bubble per 100 milliseconds.

2. The sizing agent for a reinforcement fiber according to claim 1, wherein the weight ratio of the ester compound (A) ranges from 10 to 99 wt % of the nonvolatile components of the sizing agent, and the weight ratio of the polyoxyalkylene alkyl ether (B) ranges from 0.5 to 10 wt % of the nonvolatile components of the sizing agent.

3. The sizing agent for a reinforcement fiber according to claim 2, further comprising at least one resin selected from a group consisting of an aromatic polyester-polyurethane resin (C) and an aromatic polyester resin (D).

4. The sizing agent for a reinforcement fiber according to claim 3, wherein the weight ratio of the sum of the ester compound (A) and the resin ranges from 60 to 99 wt % of the nonvolatile components of the sizing agent, and the weight ratio of the polyoxyalkylene alkyl ether (B) ranges from 0.5 to 10 wt % of the nonvolatile components of the sizing agent.

5. The sizing agent for a reinforcement fiber according to claim 3, wherein the thermoplastic matrix resin is a polyamide resin.

6. The sizing agent for a reinforcement fiber according to claim 3, wherein the thermal weight loss of the nonvolatile components of the sizing agent is not more than 10 wt % when the nonvolatile components are heated to 300° C.

7. The sizing agent for a reinforcement fiber according to claim 1, further comprising at least one resin selected from the group consisting of an aromatic polyester-polyurethane resin (C) and an aromatic polyester resin (D).

8. The sizing agent for a reinforcement fiber according to claim 7, wherein the weight ratio of the sum of the ester compound (A) and the resin ranges from 60 to 99 wt % of the nonvolatile components of the sizing agent, and the weight ratio of the polyoxyalkylene alkyl ether (B) ranges from 0.5 to 10 wt % of the nonvolatile components of the sizing agent.

9. The sizing agent for a reinforcement fiber according to claim 1, wherein the thermoplastic matrix resin is a polyamide resin.

10. The sizing agent for a reinforcement fiber according to claim 1, wherein the thermal weight loss of the nonvolatile components of the sizing agent is not more than 10 wt % when the nonvolatile components are heated to 300° C.

11. The sizing agent for a reinforcement fiber according to claim 1, wherein the ester compound (A) is an aromatic compound or an aliphatic compound.

12. The sizing agent for a reinforcement fiber according to claim 1, wherein the ester compound (A) is at least one compound selected from the group consisting of alkyl (meth)acrylate, alkoxypolyalkylene glycol (meth)acrylate, benzyl (meth)acrylate, phenoxyethyl (meth)acrylate, 2-hydroxyalkyl (meth)acrylate, dialkylaminoethyl (meth)acrylate, glycidyl (meth)acrylate, 2-methacryloyloxyethyl 2-hydroxypropyl phthalate, polyalkylene glycol di(meth)acrylate, alkanediol di(meth)acrylate, glycerin di(meth)acrylate, 2-hydroxy-3-acryloyloxypropyl (meth)acrylate, dimethylol-tricyclodecane di(meth)acrylate, bisphenol A (meth)acrylate, alkylene oxide adduct of bisphenol A (meth)acrylate, bisphenol A diglycidyl ether (meth)acrylate, alkylene oxide adduct of bisphenol A diglycidyl ether (meth)acrylate, trimethylol propane tri(meth)acrylate, glycidyl (meth)acrylate, phenoxyalkyl (meth)acrylate, phenoxy polyalkylene glycol (meth)acrylate, 2-hydroxy-3-phenoxypropanol (meth)acrylate, polyalkylene glycol nonylphenyl ether (meth)acrylate, 2-(meth)acryloyloxyethyl succinic acid, 2-(meth)acryloyloxyethyl phthalic acid, 2-(meth)acryloyloxyethyl-2-hydroxyethyl-phthalic acid, neopentyl glycol (meth)acrylic acid benzoate, alkylene oxide adduct of trimethylol propane tri(meth)acrylate, pentaerythritol tri(meth)acrylate, pentaerythritol tetra(meth)acrylate, dipentaerythritol hexa(meth)acrylate, and pentaerythritol tri(meth)acrylate hexamethylene diisocyanate urethane prepolymer.

13. A synthetic fiber strand manufactured by applying the sizing agent for a reinforcement fiber according to claim 1 to a base synthetic fiber strand.

14. A synthetic fiber strand according to claim 13, wherein the synthetic fiber is at least one fiber selected from the group consisting of carbon fiber, aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber.

15. A fiber-reinforced composite containing a thermoplastic matrix resin and the synthetic fiber strand according to claim 13.

* * * * *